United States Patent
Koob et al.

(10) Patent No.: US 9,858,201 B2
(45) Date of Patent: Jan. 2, 2018

(54) SELECTIVE TRANSLATION LOOKASIDE BUFFER SEARCH AND PAGE FAULT

(71) Applicant: QUALCOMM Incorporated, San Diego, CA (US)

(72) Inventors: Christopher Edward Koob, Round Rock, TX (US); Erich James Plondke, Austin, TX (US); Jiajin Tu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 14/626,925

(22) Filed: Feb. 20, 2015

(65) Prior Publication Data

US 2016/0246731 A1 Aug. 25, 2016

(51) Int. Cl.
*G06F 12/10* (2016.01)
*G06F 12/1027* (2016.01)
*G06F 11/07* (2006.01)
*G06F 12/08* (2016.01)
*G06F 1/32* (2006.01)

(52) U.S. Cl.
CPC ............ *G06F 12/1027* (2013.01); *G06F 1/32* (2013.01); *G06F 11/073* (2013.01); *G06F 11/079* (2013.01); *G06F 12/08* (2013.01); *G06F 2212/1028* (2013.01); *G06F 2212/1032* (2013.01); *G06F 2212/502* (2013.01); *G06F 2212/684* (2013.01); *Y02B 60/1225* (2013.01)

(58) Field of Classification Search
CPC .... G06F 12/1027; G06F 12/08; G06F 11/073; G06F 11/079
See application file for complete search history.

(56) References Cited

U.S. PATENT DOCUMENTS 3,012,227 A 12/1961 Astrahan et al.
4,200,915 A 4/1980 Grants et al.
(Continued)

FOREIGN PATENT DOCUMENTS

EP 0297931 A2 1/1989
EP 1182570 A2 2/2002
(Continued)

OTHER PUBLICATIONS

Ashok R., et al., "Cooi-Mem: Combining Statically Speculative Memory Accessing with Selective Address Translation for Energy Efficiency", Department of Electrical and Computer Engineering University of Massachusetts, Amherst, MA 01003, Sep. 2002, pp. 133-143.
(Continued)

*Primary Examiner* — Ryan Bertram
(74) *Attorney, Agent, or Firm* — Muncy, Geissler, Olds & Lowe, P.C./QUALCOMM

(57) ABSTRACT

A translation lookaside buffer (TLB) stores translation entries. The translation entries include a virtual address, a physical address and a memory local/not-local flag. When a processor is in a low power/local memory mode a virtual address is received. A matching translation entry has a local/not-local flag. Upon the local/not-local flag indicating the physical address of the matching translation entry being outside the local memory, an out-of-access-range memory access exception is generated.

24 Claims, 4 Drawing Sheets

(56) References Cited

U.S. PATENT DOCUMENTS

| | | | |
|---|---|---|---|
| 5,113,511 A | 5/1992 | Nelson et al. | |
| 5,295,258 A * | 3/1994 | Jewett | G06F 1/12 |
| | | | 714/12 |
| 5,386,563 A | 1/1995 | Thomas | |
| 5,996,051 A | 11/1999 | Mergard | |
| 6,336,162 B1 | 1/2002 | Ueda | |
| 6,412,056 B1 | 6/2002 | Gharachorloo et al. | |
| 6,697,916 B2 | 2/2004 | Lasserre et al. | |
| 6,779,085 B2 | 8/2004 | Chauvel | |
| 6,799,257 B2 | 9/2004 | Sprangle et al. | |
| 7,143,203 B1 | 11/2006 | Altmejd | |
| 7,146,469 B2 | 12/2006 | Watanabe | |
| 7,177,996 B2 | 2/2007 | Ehama et al. | |
| 7,461,232 B2 | 12/2008 | Nicolai | |
| 7,516,274 B2 | 4/2009 | Moll et al. | |
| 7,653,789 B2 | 1/2010 | Wright et al. | |
| 8,200,901 B1 | 6/2012 | Wentzlaff et al. | |
| 8,639,245 B2 | 1/2014 | Shi et al. | |
| 2001/0021278 A1 | 9/2001 | Fukuda et al. | |
| 2003/0061461 A1 | 3/2003 | Circello et al. | |
| 2004/0064655 A1 | 4/2004 | Paulraj | |
| 2004/0128574 A1 * | 7/2004 | Ricci | G06F 1/3203 |
| | | | 713/320 |
| 2005/0091468 A1 | 4/2005 | Morita et al. | |
| 2006/0288243 A1 * | 12/2006 | Kim | G06F 1/3203 |
| | | | 713/300 |
| 2007/0277023 A1 | 11/2007 | Weiberle et al. | |
| 2008/0147977 A1 | 6/2008 | Toussi | |
| 2010/0293342 A1 | 11/2010 | Morfey et al. | |
| 2011/0072234 A1 * | 3/2011 | Chinya | G06F 12/1027 |
| | | | 711/207 |
| 2011/0093654 A1 | 4/2011 | Roberts et al. | |
| 2012/0159221 A1 * | 6/2012 | Guddeti | G06F 1/3228 |
| | | | 713/323 |
| 2013/0007488 A1 | 1/2013 | Jo | |
| 2013/0117531 A1 | 5/2013 | Grochowski et al. | |
| 2013/0212335 A1 | 8/2013 | Teranishi et al. | |
| 2014/0006684 A1 * | 1/2014 | Ramakrishnan | G06F 12/16 |
| | | | 711/102 |
| 2014/0068225 A1 | 3/2014 | Plondke et al. | |
| 2014/0075123 A1 * | 3/2014 | Hildesheim | G06F 12/1027 |
| | | | 711/133 |
| 2014/0143577 A1 * | 5/2014 | Nachimuthu | G06F 12/08 |
| | | | 713/324 |
| 2015/0324122 A1 | 11/2015 | Kaminaga | |
| 2016/0103784 A1 | 4/2016 | Stewart et al. | |
| 2016/0246534 A1 * | 8/2016 | Koob | G06F 3/0604 |

FOREIGN PATENT DOCUMENTS

| | | |
|---|---|---|
| WO | 9821712 A2 | 5/1998 |
| WO | 2007059085 A2 | 5/2007 |
| WO | 2011112523 A2 | 9/2011 |
| WO | 2013095559 A1 | 6/2013 |

OTHER PUBLICATIONS

Balasubramonian R., et al., "Memory Hierarchy Reconfiguration for Energy and Performance in General-Purpose Processor Architectures", Dec. 2000, pp. 245-257.

International Search Report and Written Opinion—PCT/US2016/015599—ISA/EPO—dated Apr. 8, 2016.

* cited by examiner

SELECTIVE TRANSLATION LOOKASIDE BUFFER SEARCH AND PAGE FAULT

FIELD OF DISCLOSURE

The present application is generally related to translation lookaside buffer (TLB) structure and management.

BACKGROUND

Portable computing devices, such as wireless telephones and personal digital assistants (PDAs), continually require increased data storage capacity and processing speed. For example, a wireless telephone may concurrently serve as a digital camera, multi-media file player, and portable game player. Concurrent with increasing functionality and performance requirements, available battery volume is decreasing, e.g., due to smaller portable devices and/or volume being occupied by other hardware.

One known technique for reducing power is to configure the computing device to switch, for example, in response to explicit instructions, to a local memory/low power mode. In the local memory/low power mode, a processing core may be allowed to access only a set of lower power local resources, e.g., a local memory which may be tightly coupled to the processing core, and selected other low power and/or essential device resources, and not have access non-local resources.

In the local memory/low power mode, some or all of the non-local resources can be powered down or otherwise placed in a non-operational state, providing power savings. However, a power on sequence must be executed before the non-local resources are accessible to the processor core. In addition, attempts to access non-local resources while operating in the local resources low power mode must be prohibited, since those resources may be nonoperational. Known conventional techniques for preventing such access can have costs and other shortcomings.

For example, one known technique for preventing attempts to access non-local resources when operating in the local memory/low power mode is to invalidate, when switching to that mode, all entries in the computing device's translation lookaside buffer (TLB) that point to non-local resources. The result is that any attempt to access non-local resources while in the local memory/low power mode will cause a "page fault exception" because there is no valid mapping entry in the TLB. However, invalidating all the TLB entries that point to non-local resources can require significant processing power and time. Also, upon awakening to normal power operation, a significant number of TLB misses and resulting page walk searches may be required until the TLB is repopulated with valid external memory translation entries. The repeated page walk searches can carry substantial power and time costs.

SUMMARY

This Summary identifies some example aspects, and is not an exhaustive description of disclosed subject matter. Whether a feature is included in, or omitted from the Summary is not intended as an indicator of relative importance. Additional features and aspects are described, and will become apparent to persons skilled in the art upon reading the following detailed description and viewing the drawings that form a part thereof.

Various aspects can provide, among other features, means and methods for rapid, low processing overhead switching between a local memory/low power mode that can confine access to local memory, and a normal power mode enabling full access, for example, to remote memory and other resources. Further aspects can provide, for example, switching to a local memory/low power mode without requiring invalidating of translation lookaside buffer entries, and switching back to a normal power mode, and providing corresponding full access, without requiring TLB miss/page walk refilling a translation lookaside buffer.

Examples according to one or more disclosed method aspects can provide access of memory, and example operations can include storing in a translation lookaside buffer a plurality of translation entries, and each may comprise a virtual address, a physical address and a local memory flag and, in an aspect, the local memory flag can indicate whether the physical address is outside a local memory. Example operations, can further include, when a processor is in a low power mode, receiving a generated virtual address, and upon identifying a matching translation entry having a virtual address matching the generated virtual address, then, if the local memory flag of the matching translation entry indicates the physical address of the matching translation entry is outside the local memory, example operations can include generating an out-of-access-range memory access exception.

Examples according to one or more disclosed apparatus aspects can provide access memory, and can include a translation lookaside buffer (TLB) that can be configured to store a plurality of translation entries, and each may comprise a virtual address, a physical address and a local memory flag and, in aspect, the local memory flag can indicate whether the physical address is outside a local memory. Example apparatuses according to one or more aspects can be further configured to receive a generated virtual address, and to identify a matching translation entry having a virtual address matching the generated virtual address. Example apparatuses according to one or more aspects can further include an out-of-access-range exception circuit that may be configured to generate, in response to the local flag of the matching translation entry indicating the physical address of the matching translation entry is outside the local memory, an out-of-access-range memory access exception.

Examples according to one or more other disclosed apparatus aspects can provide access of memory, and include means for storing a plurality of translation entries, each of which may comprise a virtual address, a physical address and a local memory flag. In an aspect, the local memory flag can indicate whether the physical address is outside a local memory. Examples according to other apparatus aspects can include means for receiving, when a processor is in a low power mode, a generated virtual address, means for identifying a matching translation entry having a virtual address matching the generated virtual address, and can include means for generating, if the local memory flag of the matching translation entry indicates the physical address of the matching translation entry is outside the local memory, an out-of-access-range memory access exception.

Examples according to one or more disclosed aspects of non-transitory computer-readable medium may comprise code, which, when executed by a processor, may cause the processor to store in a translation lookaside buffer (TLB) a plurality of translation entries, each of which may comprise a virtual address, a physical address and a local memory flag. In examples according to one aspect, the local memory flag may indicate whether the physical address is outside a local memory. In examples according to an aspect, the code may, when executed by a processor, when a processor is in a low power mode, cause the processor to receive a generated virtual address, and upon identifying a matching translation entry having a virtual address matching the generated virtual address, then, if the local memory flag of the matching translation entry indicates the physical address of the matching translation entry is outside the local memory, to generate an out-of-access-range memory access exception.

BRIEF DESCRIPTION OF THE DRAWINGS

The accompanying drawings are presented to aid in the description of aspects, and are provided solely for illustrative examples according to and showing aspects, and are not a limitation thereof.

DETAILED DESCRIPTION

Aspects are disclosed in the following description and related drawings. Various alterations that do not depart from the scope of the disclosed aspects may become apparent upon reading this disclosure. Additionally, in description of certain example applications, implementations and operations related to same, instances are identified, explicitly or implicitly from the described context, where known conventional techniques may be employed for certain components and acts. In such instances, detailed description of the employed conventional techniques may be omitted so as not to obscure relevant details of the invention.

The word "exemplary" is used herein to mean "serving as an example, instance, or illustration." Any aspect or example configuration of same that described herein as "exemplary" is not necessarily to be construed as preferred or advantageous over other aspects or configurations. Likewise, discussion of a feature, advantage or mode of operation in relation to the term "aspects of the invention" does not imply that all aspects of the invention include the discussed feature, advantage or mode of operation.

The terminology used herein is for the purpose of describing particular aspects only and is not intended to be limiting of the invention. As used herein, the singular forms "a," "an," and "the" are intended to include the plural forms as well, unless the context clearly indicates otherwise. In addition, the terms "comprises," "comprising," "includes" and/or "including," as used herein, specify the presence of stated features, integers, steps, operations, elements, and/or components, but do not preclude the presence or addition of one or more other features, integers, steps, operations, elements, components, and/or groups thereof.

Further, certain aspects are described in terms of example operations. It will be understood that except where otherwise described such operations can be performed by specific circuits (e.g., application specific integrated circuits (ASICs)), by program instructions being executed by one or more processors, or by a combination of both. In addition, specific circuits (e.g., ASICs), processors and program instructions executed by one or more of the same may be described as "logic configured to" perform described operations and action(s). Additionally, sequences of actions described herein can be considered to be embodied entirely within any form of computer readable storage medium having stored therein a corresponding set of computer instructions that upon execution would cause an associated processor to perform the functionality described herein. Thus, various aspects may be embodied in a number of different forms, all of which are contemplated to be within the scope of the claimed subject matter.

Figure 1:
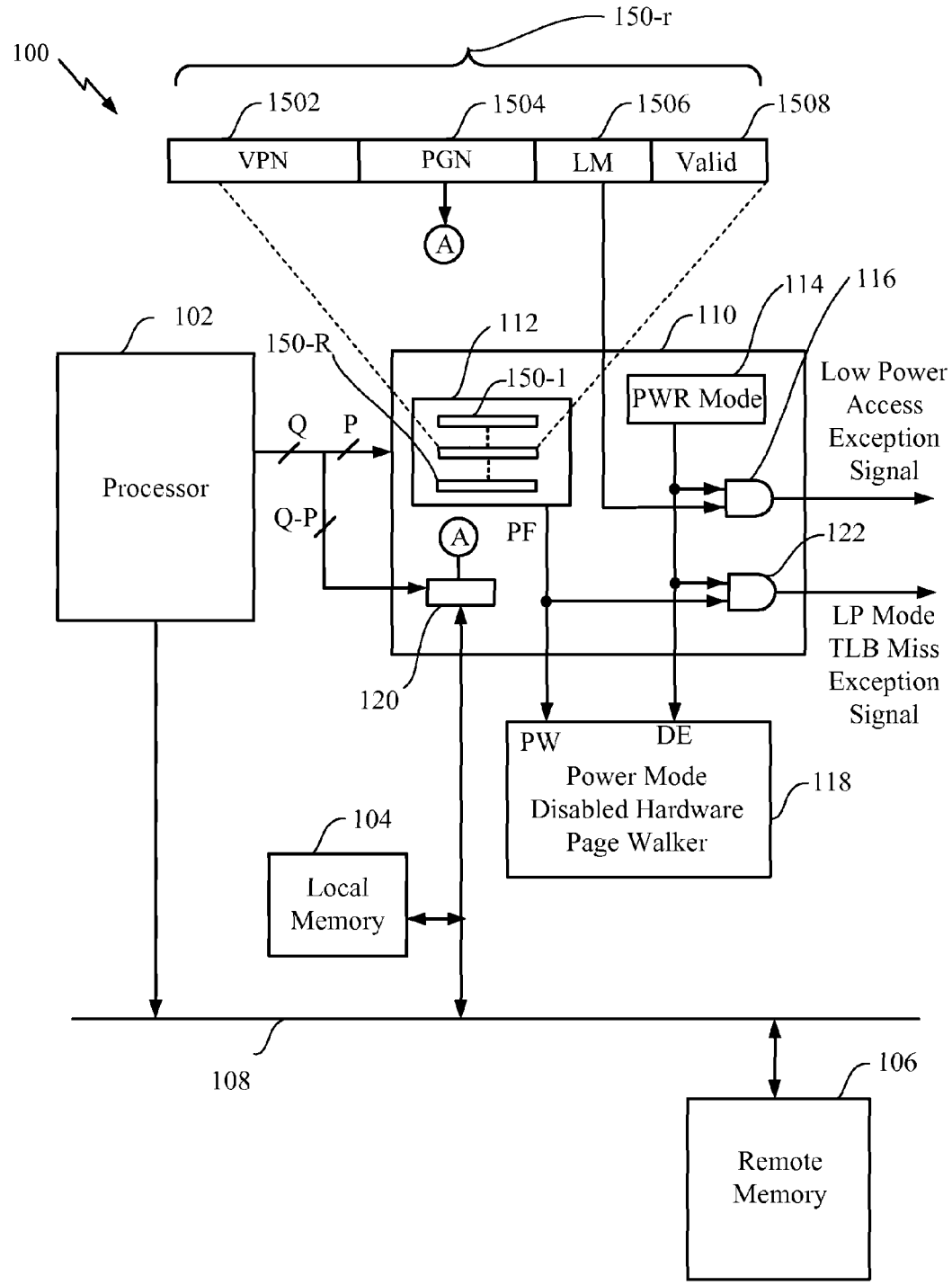
FIG. 1 is a logical block schematic of one example switchable power/memory access mode processor in accordance with one or more aspects.

FIG. 1 shows a logical block schematic of one example switchable power/memory access mode processor 100 in accordance with one or more aspects.

In an aspect, the switchable power/memory access mode processor 100 may include an instruction execution circuit 102, which can be, for example, an ARM™ or other similar architecture microprocessor core, or any other architecture programmable state machine capable of executing computer-executable instructions (not shown in FIG. 1). Computer-executable instructions for the instruction execution circuit 102 can be stored in memory resources including, for example, a local memory 104 tightly coupled to the instruction execution circuit 102, and a remote memory 106 that may be connected to the instruction execution circuit 102 through, for example, a bus 108. It will be understood that the terms "local and "remote," in the context of "local memory" 104 and "remote memory" 106 are not necessarily descriptors of physical distance. For example, the local memory 104 and remote memory 106 may have any relative distance from the instruction execution circuit 102. In an aspect, the local memory 104 may be tightly coupled to the instruction execution circuit 102, e.g., via a dedicated link or bus (not specifically shown in FIG. 1).

Continuing to refer to FIG. 1, in an aspect, the instruction execution circuit 102 can generate virtual addresses that a translation lookaside unit 110 translates into actual physical addresses for accessing, for example, the local memory 104, the remote memory 106 and other non-local resources. The translation lookaside unit 110 can have a translation lookaside buffer (TLB) 112 having a content-addressable memory (CAM) (not separately shown in FIG. 1) storing R virtual page entries (hereinafter "translation entries") such as the visible examples labeled 150-1, 1502 . . . 150-R (and referenced collectively as "the translation entries 150.") Each translation entry 150 can map a virtual page (i.e., a page according the instruction execution circuit 102 virtual addressing scheme) to a physical page number. The physical page number may correspond to the local memory 104, the remote memory 106, or another non-local resource. The R translation entries 150 can be a portion of a larger (not shown in FIG. 1) virtual address-to-physical address (hereinafter "virtual-to-physical") mapping (not specifically visible in FIG. 1).

The TLB 112 can be configured to access its R translation entries 150 using at least a portion of the virtual address generated by the instruction execution circuit 102 (e.g., P bits of a Q bit virtual address). The TLB 112 may have CAM address decoders (not shown in the figures), and can include write circuitry (not shown in the figures) to update the translation entries 150. The CAM address decoders and write circuitry can be implemented using conventional TLB techniques, which may be supplemented with a selective enabling described later in greater detail. In an aspect, the TLB 112 can be configured to indicate a "TLB hit event" when it finds a translation entry 150 that matches the virtual address (or P bit field of that virtual address) it receives from the instruction execution circuit 102. In a similar aspect, the TLB 112 can be configured to identify a "TLB miss event" in response to finding no matching translation entry 150. In a further aspect, the TLB 112 can be configured to generate, in association with identifying a TLB miss event, a page fault signal (abbreviated in FIG. 1 as "PF").

Referring to the FIG. 1 enlarged view of a representative example translation entry, labeled "150-r," the translation entries 150 can include a virtual address page number (VPN) field 1502, a physical address page number field 1504 (hereinafter "page field 1504," and abbreviated as "PGN" in FIG. 1) and, in an aspect, a local memory flag field 1506. In an aspect, the local memory flag field 1506 can hold a "local flag" (abbreviated as "LM" in FIG. 1) having a value that may be switchable between a first value that indicates the physical address in the page field 1504 is a location in the local memory 104, and a second value that indicates the physical address is a location not in the local memory 104. For purposes of description, logical "0" will be assigned as the first value of the local memory flag and logical "1" will be assigned as the second value of the local memory flag. This assignment is arbitrary and is not intended to limit the scope of any aspect. Example features and operations relating to the local memory flag are described in greater detail in later sections.

Referring to the representative translation entry 150-r, a valid/not-valid field, such as the example "Valid" field 1508 can also be included. The Valid field 1508 can be set and used in accordance with known, conventional TLB valid/not-valid field techniques and, therefore, further detailed description is omitted.

Referring to FIG. 1, in an aspect the switchable power/memory access mode processor 100 can further comprise a register, such as the power mode register 114 (labeled by the abbreviation "PWR Mode" in FIG. 1) that is assigned or configured to store a power mode indicator. The power mode register 114 can be, for example, a feature of the translation lookaside unit 110. The power mode indicator can have a value that is switchable between a first value, e.g., logical "0," indicating the switchable power/memory access mode processor 100 is in its normal power mode, and a second value, e.g., logical "1," indicating the switchable power/memory access mode processor 100 is in its low power mode. This assignment is arbitrary and is not intended to limit the scope of any aspect.

With continuing reference to FIG. 1, in an aspect, the translation lookaside unit 110 can include a low power mode out-of-range access exception logic 116, abbreviated for brevity in this description by the arbitrary name "LP access exception logic 116." The LP access exception logic 116 can be configured to receive the local memory flag (e.g., from the local memory flag field 1506) of the retrieved translation entry 150 corresponding to a TLB hit and to receive the power mode indicator from the power mode register 114. The LP access exception logic 116 can be configured to generate, while the switchable power/memory access mode processor 100 is in the low power mode, a low power access exception signal in response to the local memory flag of a TLB hit indicating the physical address is outside of local memory, Referring to FIG. 1, it will be appreciated by persons of ordinary skill from reading this disclosure that specific implementation of the LP access exception logic 116 may depend, at least in part, on the logical value(s) assigned to the local memory flag, the power mode indicator, and the desired polarity of the low power access exception signal.

As one illustration, logical "1" may be assigned as the value of the active low power access exception signal. The above-described example assignment of values to the local memory flag is logical "0" and logical "1" to indicate, respectively, the physical address of the TLB hit being inside and outside the local memory 104. The above-described example assignment of values to the power mode indicator stored in the power mode register 114 is logical "0" and logical "1" to indicate, respectively, the switchable power/memory access mode processor 100 being in its normal power mode and low power mode. The LP access exception logic 116 can then, as visible in FIG. 1, be implemented as an AND gate. In example operations, further described in later sections, of the switchable power/memory access mode processor 100 in its low power mode, a TLB bit having a physical address outside the local memory will cause a concurrence (i.e., an interval of mutually concurrent existence) at the inputs of the LP access exception logic 116, of a logical "1" value of the local memory flag and a logical "1" value of the power mode indicator. The AND operation of the example implementation of the LP access exception logic 116 will output, as the result, an active (meaning logical "1") value of the low power access exception signal.

In an aspect, the switchable power/memory access mode processor 100 can include a power mode disabled hardware page walker circuit 118. The power mode disabled hardware page walker circuit 118 can be configured, according to a further aspect, to receive the page fault signal that the TLB 112 generates in response to a TLB miss event, and to receive the power mode indicator from the power mode register 114. In an aspect, the power mode disabled hardware page walker circuit 118 can be configured to disable itself, i.e., become not operational as to performing a page walking, when it receives the power mode indicator at the value indicating the low power mode. Referring to FIG. 1, the visible example of the LP mode disabled hardware page walker circuit 118 is shown having a disable input, arbitrarily labeled "DE," for receiving the power mode indicator, and having an input arbitrarily labeled "PW" to receive the page fault signal. Logical "1" can be assigned as the value of the power mode indicator that indicates the low power mode, as described previously in this disclosure. Assuming that example assigned value of the power mode indicator, the LP mode disabled hardware page walker circuit 118 may be configured to disable itself in response to receiving a logical "1" at its DE input.

The power mode disabled hardware page walker circuit 118 can be configured, according to a further aspect, to perform, in response to receiving the page fault signal while enabled (e.g., while receiving the power mode indicator at logical "0"), a hardware page walk of the previously described larger (e.g., system-wide) virtual-to-physical mapping. The power mode disabled hardware page walker circuit 118 can be implemented, for example, as a combination of known, conventional hardware page walker circuitry (not specifically shown) with added disabling logic (not specifically shown) configured to receive the power mode indicator. A person of ordinary skill in the art can implement such a combination of conventional hardware page walker circuitry and disabling logic by applying conventional engineering know-how such persons possess to the present disclosure, without undue experimentation. Further detailed description is therefore omitted.

In an aspect, the switchable power/memory access mode processor 100, or an outside processor or operating environment (not shown in FIG. 1), can be configured to respond to the low power access exception signal from the LP access exception logic 116 by invoking a particular exception handler (not shown in the figures). The particular exception handler can be arbitrarily termed an "out-of-allowable-access range exception handler." The out-of-allowable-access range exception handler may be configured to provide recovery from an attempt of the instruction execution circuit 102 to access a non-local resource, e.g., a location outside of the local memory 104, while the switchable power/memory access mode processor 100 is in the low power mode. Particular recovery operations performed by the out-of-allowable access range exception handler can be, at least in part, application-specific, but can be readily implemented by persons of ordinary skill in the art by applying conventional engineering know-how such persons possess to the present disclosure, without undue experimentation. Further detailed description is therefore omitted.

Example operations of the switchable power/memory access mode processor 100 in the normal power mode will now be described. In one example, the instruction execution circuit 102 can send a virtual address to the translation lookaside unit 110. The virtual address may have Q bits, as previously described. Using, for example, P of the Q bits the TLB 112 can search its R translation entries 150. If a matching translation entry is found, a TLB hit event is generated. The local memory flag field 1506 of the matching translation entry may have a local memory flag, which may be at a logical value ("0" or "1") indicating whether the content of the page field 1504 corresponds to the local memory 104. However, the power mode register 114 value is logical "0" when the switchable power/memory access mode processor 100 is in the normal power mode, and the logical AND operation of the LP access exception logic 116 therefore renders the local memory flag to be a logical "0" value. The switchable power/memory access mode processor 100 in its normal power mode therefore responds to a TLB hit event by generating a complete physical address (e.g., through an offset circuit 120 operating on the page field 1504 of the retrieved translation entry 150) irrespective of the local memory flag value.

Continuing with description of example normal power mode operation, if the TLB 112 cannot find a translation entry among the R translation entries 150 a TLB miss event (not separately shown in FIG. 1) is generated. The TLB 112, in response, sends a page fault signal, indicating no matching translation entry found, to the PW input of the power mode disabled hardware page walker circuit 118. Since the power mode indicator received at the DE input is logical "0," the power mode disabled hardware page walker circuit 118 is enabled. The power mode disabled hardware page walker circuit 118 therefore responds to the page fault signal by performing a hardware page walk of page tables (not shown in FIG. 1) having, as previously described, a complete, updated virtual-to-physical mapping for the instruction execution circuit 102 to access all of its memory and other resources.

The hardware page walk performed by the power mode disabled hardware page walker circuit 118 can produce either of two results. One is finding in the page tables a virtual-to-physical mapping for the virtual address that caused the TLB miss event. The other possible result is not finding any virtual-to-physical mapping. If the virtual-to-physical mapping is found, the power mode disabled hardware page walker circuit 118 can provide it to the translation lookaside unit 110 for updating the TLB 112. The updating of the TLB 112 can creating a new translation entry 150 comprising, in addition to conventional TLB mapping information, the local memory flag field 1506 with its local memory flag set to indicate whether the physical address found by the hardware page walk is in, or is not in the local memory 104. Accordingly, in aspect, one or more of the power mode disabled hardware page walker circuit 118, the translation lookaside unit 110, or other logic (not separately labeled in FIG. 1) can be configured to identify whether the physical address field of the virtual-to-physical mapping found by the power mode disabled hardware page walker circuit 118 is, or is not in the local memory 104. In a further aspect, one or more of the translation lookaside unit 110 and the power mode disabled hardware page walker circuit 118 may be configured to set the local memory flag in the local memory flag field 1506 of the new translation entry in the TLB 112 according to that identification whether the physical address location is in or not in the local memory 104.

The above-described example operations were associated with the switchable power/memory access mode processor 100 being in its normal power mode. Example low power mode operations of the switchable power/memory access mode processor 100 will now be described. The switchable power/memory access mode processor 100 may be configured, for example, to switch to the low power mode in response to receipt of an externally generated command (not explicitly visible in FIG. 1). Associated with switching to the low power mode, the power mode indicator in the power mode register 114 can be set at logical "1."

One example low power mode access operation can begin with the instruction execution circuit 102 sending a virtual address to the translation lookaside unit 110. If the translation lookaside unit 110 finds a matching translation entry 150, it generates a TLB hit event (not specifically shown in FIG. 1). Example operations will be first described assuming a matching translation entry is found. Example operations that may be performed if the translation lookaside unit does not find a matching translation entry will be further described in later sections. When in the low power mode a logical "1" value of the power mode indicator from the power mode register 114 is received at the LP access exception logic 116, as opposed to the logical "0" received when in the normal power mode. That logical "1" causes the output of the LP access exception logic 116 to depend on the local flag in the local memory flag field 1506 of the matching translation entry 150. Therefore, in the low power mode, operation of the switchable power/memory access mode processor 100 in response to a TLB hit event depends on the local memory flag in the matching translation entry 150. If the local memory flag indicates the physical page number in the page field 1504 being in the local memory 104, the operations can proceed as described for the normal power mode, namely, a physical address can be generated and the local memory 104 accessed. If, however, the local memory flag identifies the physical page number in the page field 1504 being outside the local memory 104, the LP access exception logic 116 will output an active (in this example, logical "1") low power access exception signal. The active low power access exception signal, in an aspect, can cause the previously described out-of-allowable-access range exception handler to be invoked.

Referring to FIG. 1, during the above-described operations associated with a TLB hit event while in the low power mode, the power mode disabled hardware page walker circuit 118 was disabled, by its DE input receiving the logical "1" value of the power mode indicator. In an aspect, the switchable power/memory access mode processor 100 can include logic configured to generate a low power mode TLB miss exception signal, in response to a TLB miss event while in the low power mode. One example implementation of such logical can be the logical AND circuit 122, which can be configured to perform a logical AND of the power mode indicator and the page fault signal that is output from the TLB 112. A TLB miss event while in the low power mode can produce a concurrence (meaning an interval of mutually concurrent existence) of the power mode indicator and the page fail output of the TLB 112 at the inputs of the logical AND circuit 122. The logical AND circuit 122 can generate a resulting active (in this example, logical "1") low power mode TLB miss exception signal.

Switching the switchable power/memory access mode processor 100 can include, setting the power mode indicator in the power mode register 114 to the value indicating the normal power mode. Operation can then include, when in the normal power mode, receiving another virtual address, at TLB 112, identifying another matching translation 150 entry having a virtual address matching the another virtual address, accessing a memory, e.g., the local memory 104 or the remote memory 106, irrespective of the local memory flag.

Figure 2:
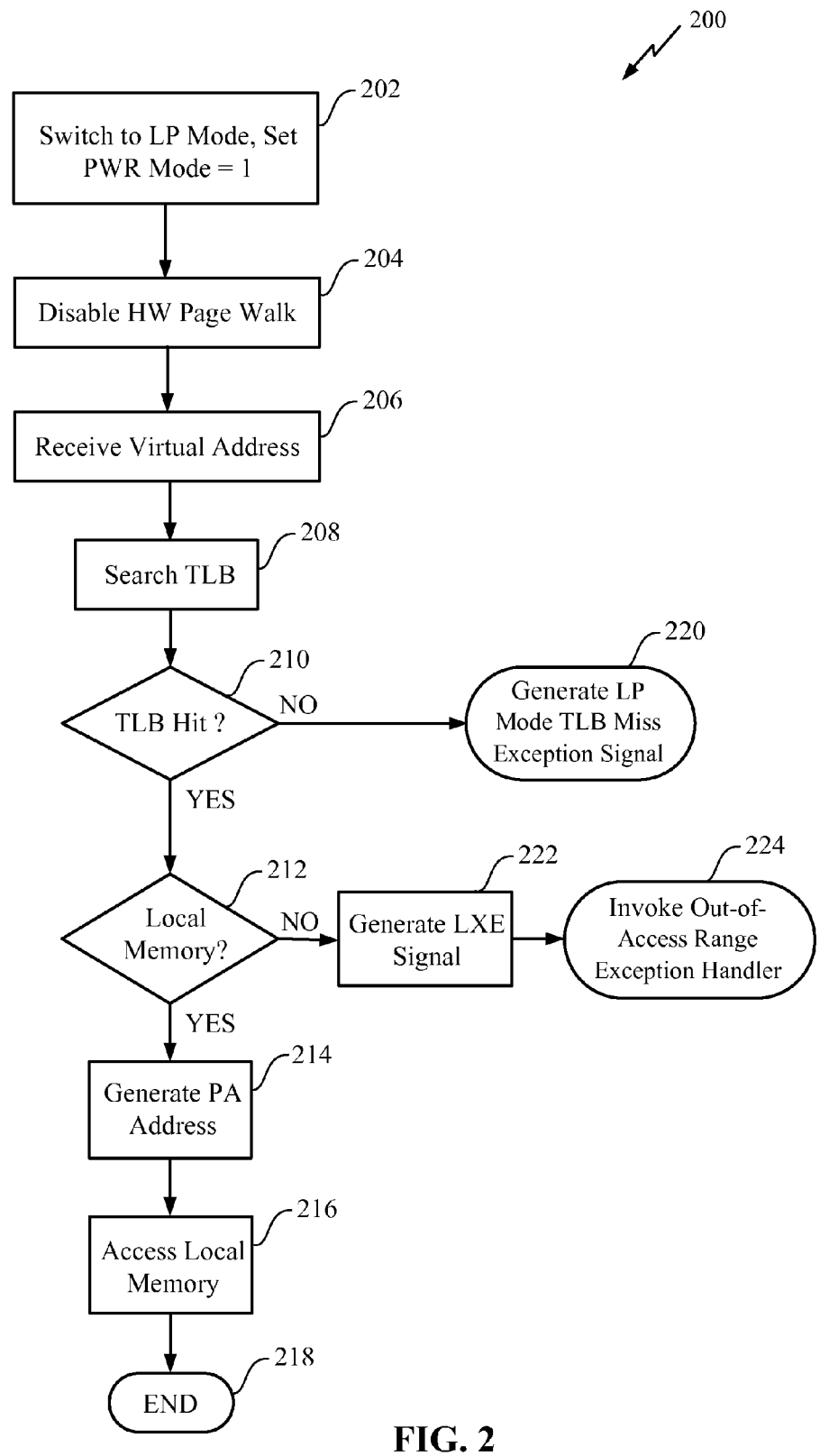
FIG. 2 shows a logical flow diagram of example operations in one local low power mode memory access process, in systems and methods according to one or more aspects.

FIG. 2 shows a logical flow 200 of example operations in processes of memory accesses associated with switching to a low power (abbreviated as "LP" in FIG. 2) mode according to one or more aspects. For convenience, example operations will be described in reference to the FIG. 1 switchable power/memory access mode processor 100. It will be understood that such description is not intended to limit any aspect or practice of same to the FIG. 1 switchable power/memory access mode processor 100 or its architecture.

Referring to FIGS. 1 and 2, operations in the flow 200 can start at 202 where, for example, in response to an external instruction (not explicitly visible in FIGS. 1 and 2), the switchable power/memory access mode processor 100 switches to a low power mode. In an aspect, operations at 202 can include setting a mode register to indicate the switch to the low power mode. For example, the power mode indicator in the power mode register 114 can be set to logical "1." The flow 200, in association with switching to the low power mode at 202, can at 204 disable the hardware page walk. Referring to FIG. 1, the disabling operation at 204 can be performed by the power mode disabled hardware page walker circuit 118 in response to receiving the logical "1" power mode indicator at its DE input.

Upon receiving, at 206, a virtual address at the translation lookaside unit 110, for example, from the instruction execution circuit 102, the flow 200 can then proceed to 208 where the TLB 112 can search its R translation entries 150 using that received virtual address. If the searching at 208 results in a TLB hit (shown as a "YES" at decision block 206) then, as shown by decision block 210, the flow 200 can proceed to decision block 212, from which one of two paths is taken depending on the local memory flag in the local memory flag field 1506 of that matching translation entry 150. Referring to FIG. 1, operation of the decision block 212 may be provided by the logical AND, by the LP access exception logic 116, of the local memory flag and the logical "1" power mode indicator from the power mode register 114. For purposes of this description, the assigned values of the local memory flag are logical "1" for the physical address of the matching translation entry being in the local memory 104, and logical "0" for that physical address not being in the local memory 104. Using that assignment, if the local memory flag is a logical "1" (i.e., physical address of the matching translation entry 150 is in the local memory 104) the flow 200 can proceed from the "YES" branch of 212 to 214 to generate the complete physical address, e.g., using the page field 1504 of the matching translation entry 150.

The flow 200 can then proceed to 216 and access the local memory 104 using the physical address generated at 214, and then end at 218. The flow 200 can repeat when another virtual address is received at 206.

In the above-described example operations, the search of the TLB 112 at 208 produced a hit, causing a "YES" routing from the decision block 210. Referring to FIGS. 1 and 2, in another example, a search of the TLB 112 at 208 may fail to produce a hit, resulting in a "NO" routing from the decision block 210. The flow 200 may then proceed to 220 and generate the low power mode TLB miss exception signal, for example, based on the logical AND circuit 122 operating on the page fault from the TLB 112 and the power mode indicator at logical "1".

Referring to FIGS. 1 and 2, and looking again to the decision block 212, if the local memory flag of the matching translation entry 150 found by the TLB search at 208 shows (e.g., the local memory flag being at logical "0") the physical address in its page field 1504 is not in local memory 104, the flow 200 can proceed to 222 and generate the low power access exception signal (abbreviated as "LXE" in block item 222). Referring to FIG. 1, operations at 222 can comprise the AND operation of LP access exception logic 116. The flow 200 can then proceed to 224 and, for example, invoke the previously described out-of-access range exception hander.

Figure 3:
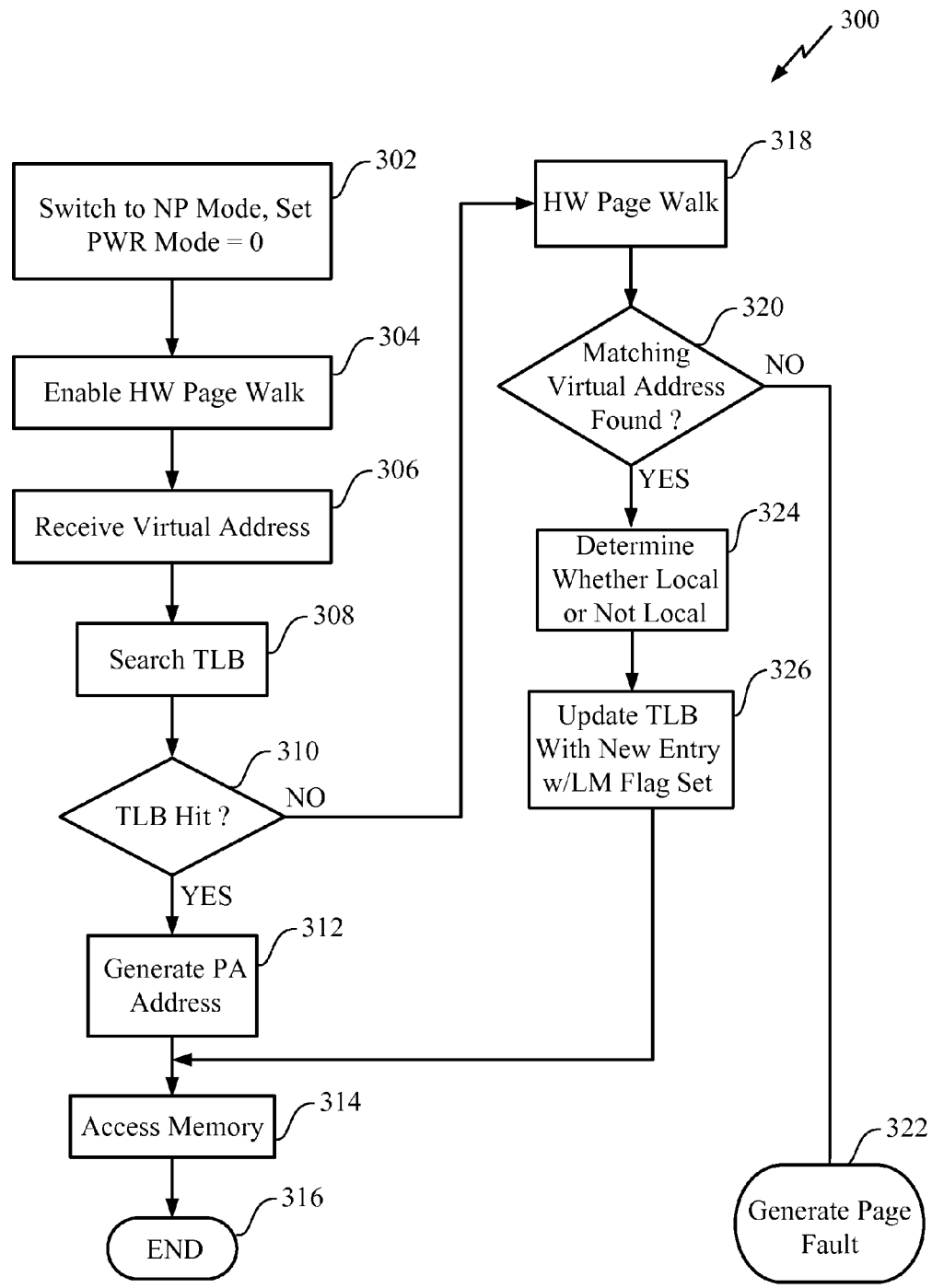
FIG. 3 shows a logical flow diagram of example operations in one normal power mode memory access process, in systems and methods according to one or more aspects.

FIG. 3 shows a logical flow 300 of example operations in processes of memory accesses associated with switching to a normal power mode according to one or more aspects. For convenience, example operations in the flow 300 are described in reference to the FIG. 1 switchable power/memory access mode processor 100. It will be understood that such description is not intended to limit any aspect or practice of same to the FIG. 1 switchable power/memory access mode processor 100 architecture.

Referring to FIGS. 1 and 3, operations in the flow 300 can start at 302 where, for example, in response to an external instruction (not explicitly visible in FIGS. 1 and 3), the switchable power/memory access mode processor 100 switches to the normal power mode (abbreviated as "NP" in block item 302). In an aspect, operations at 302 can include setting the power mode indicator in the power mode register 114 to logical "0." The flow 300, in association with switching to the normal power mode at 302 can, at 304, enable the power mode disabled hardware page walker circuit 118. Referring to FIG. 1, the enabling operation at 304 can be performed by the power mode disabled hardware page walker circuit 118 in response to receiving the logical "0" power mode indicator at its DE input. The flow 300 may then wait until a virtual address is received by the translation lookaside unit 110 at 306, for example, from the instruction execution circuit 102.

With continuing reference to FIGS. 1 and 3, upon the translation lookaside unit 110 receiving a virtual address at 306, flow 300 can proceed to 308 where the TLB 112 can search its R translation entries 150 using the virtual address received at 306. If the searching at 308 results in a TLB hit, i.e., a matching translation entry 150 being found (shown as a "YES" at decision block 310), the flow 300 can proceed to 312 and generate a complete physical address using, e.g., the page field 1504 of the matching translation entry 150. The flow 300 can then proceed to 314 and access its memory resources, e.g., the remote memory 106 and/or the local memory 104, using the physical address generated at 312. After the access at 312 the flow 300 can end at 314 and may repeat when another virtual address is received at 306.

Referring to the FIG. 1 LP access exception logic 116 and to FIG. 3, it will be understood that because of the LP access exception logic 116 and the logical "0" value of the power mode indicator associated with the normal power mode, the local memory flag in the local memory flag field 1506 of the matching translation entry 150 is irrelevant to the flow 300. It will be appreciated that this feature can provide the switchable power/memory access mode processor 100 with unlimited memory access immediately upon switching to the normal power mode operation, in contrast to needing repeated TLB misses and page walks to re-populate the TLB, as required by conventional techniques of invalidating all non-local physical address entries in the TLB.

Referring to FIG. 3, the above-described examples of operations in the flow 300 assumed a TLB hit resulting from the search at 308. In another example, referring to FIGS. 1 and 3, the search at 308 may fail to find a matching translation entry in the TLB 112. In response, as shown by the "NO" branch leaving the decision block 310, the flow 300 can proceed to 318 and perform a hardware page walk of page tables (not explicitly visible in FIG. 1). The hardware page walk performed at 318 can be according to known, conventional hardware page walk techniques and, therefore, further detailed description is omitted. Next operations in the flow 300 after the hardware page walk at 318 can depend on whether it finds a virtual-to-physical mapping, as shown by the decision block 320. If none is found, the flow 300 may, as shown by the "NO" branch leaving the decision block 320, proceed to 322 and invoke a page fault exception. The page fault exception at 322 may be according to known conventional page fault techniques in response to unsuccessful hardware page walk and, therefore, further detailed description is omitted.

Referring to FIGS. 1 and 3, if the hardware page walk at 318 finds a virtual-to-physical mapping (not explicitly visible in FIG. 1) then, as shown by the "YES" branch leaving the decision block 320, the flow 300 can proceed to 324 and determine whether the physical address field of that virtual-to-physical mapping is to a local memory, e.g., the local memory 104, or is outside of the local memory, e.g., the remote memory 106. The flow 300 can then proceed to 326 and use that determination at 324 in updating the TLB 112 with a new translation mapping entry 150. The new translation mapping entry 150 can be formatted according to the example 150-r, having in its VPN field 1502 and page field 1504 the virtual-to-physical mapping found by the hardware page walk at 318, and in its local memory flag field 1506, a local memory flag set a value (e.g., logical "0" or "1") indicating whether the physical address is in the local memory 104, or outside of the local memory, e.g., in the remote memory 106. The flow 300 can then proceed to 314, access the memory using the virtual-to-physical mapping found by the hardware page walk at 318, and then end at 316.

Figure 4:
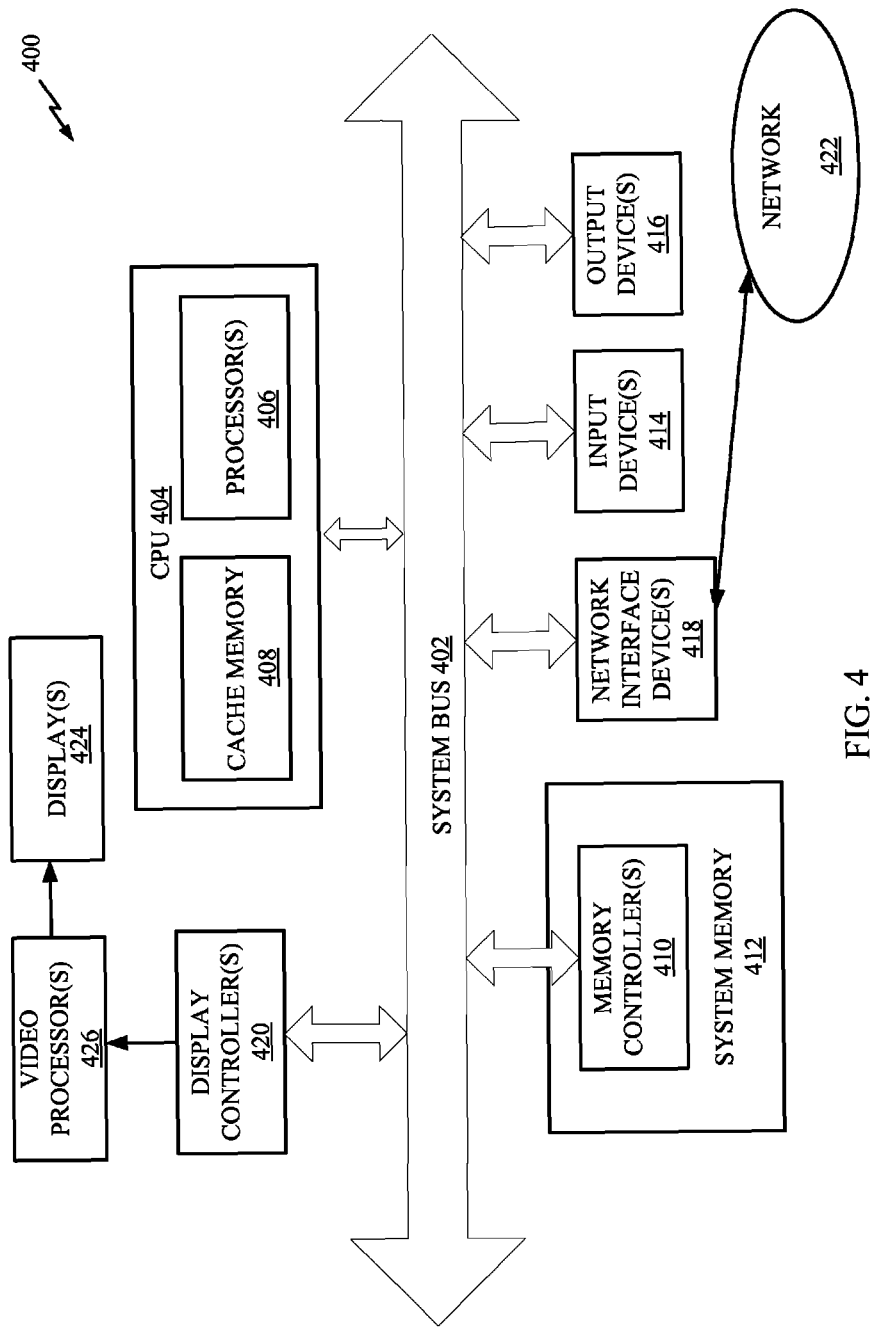
FIG. 4 shows a functional schematic of one example personal communication and computing device in accordance with one or more aspects.

FIG. 4 illustrates one example of a personal communication and computing device 400 that can be configured, as described herein, to support or provide functionalities and features described in reference to the FIG. 1 processor system 100. Referring to FIG. 4, the personal communication and computing device 400 can include a system bus 402 and, coupled to the system bus 402, one or more CPUs 404. The CPUs 404 may comprise, for example, one or more processors or CPUs 406 and one or more cache memories 408. The CPU(s) 406 may be implemented by, for example, one or more programmable computing devices such as, without limitation, one or more ARM-type processing devices (not separately visible in FIG. 4). The CPU(s) 406 may capable of performing as a master device. The CPU(s) 406 may be inter-coupled, for example through the system bus 402, to various master and slave devices. The CPUs 404 may, according to conventional communication protocols, communicate with these other devices by exchanging address, control, and data information over the system bus 402. Although not illustrated in FIG. 4, multiple system buses 402 may be provided. In examples having multiple system buses 402, each system bus 402 may constitute a different fabric.

Referring to FIG. 4, the CPU(s) 404 may communicate bus transaction requests to a memory controller 410 of a memory system 412 as one example of a slave device. Referring to FIGS. 1 and 4, in one aspect, the CPU(s) 404 may correspond to instruction execution circuit 102 of FIG. 1. The CPU(s) 404 may be configured to include circuitry (not explicitly visible in FIG. 4) and/or computer-executable code (not explicitly visible in FIG. 4), implementing the local memory 104, the translation lookaside unit 110 and the power mode disabled hardware page walker circuit 118. The memory system 412 may implement, or form a portion of, the remote memory 106. It will be understood that aspects can include designation as "local memory" certain memory resources (not necessarily visible in FIG. 4) that may be physically separated from the CPU(s) 404. Likewise, aspects can include designation as "outside of local memory" or as "remote memory" certain memory resources (not necessarily visible in FIG. 4) that may be physically arranged within areas (not necessarily visible in FIG. 4) that may be proximal to, or may even be within one or more of the CPU(s) 404.

Referring to FIG. 4, examples of other master and slave devices can include one or more input devices 414, one or more output devices 416, one or more network interface devices 418, and one or more display controllers 420. The input devices(s) 414, if employed, can include any type of input device, including but not limited to input keys, switches, voice processors, and the like. The output device(s) 416, if used, can include any type of output device, including but not limited to audio, video, other visual indicators and the like. The network interface device(s) 418, if used, can be any type of network interface device configured to allow exchange of data to and from a network 422. The network 422 can be any type of network, including but not limited to a wired or wireless network, a private or public network, a local area network (LAN), a wide area network (WLAN) and the Internet. The network interface device(s) 418 can be configured to support any type of communications protocol desired.

Continuing to refer to FIG. 4, the CPU(s) 404 may also be configured to access the display controller(s) 420 over the system bus 402 to control information sent to one or more displays 424. The display controller(s) 420 may send information to the display(s) 424 to be displayed, for example, via one or more video processors 426. The video processors 426 may. For example, process information to be displayed into a format suitable for the display(s) 424. The display(s) 424, if used, can include any type of display, for example, an active or passive liquid crystal display (LCD), a plasma display, and cathode ray tube (CRT).

The foregoing disclosed devices and functionalities may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects and example implementations of the same, it should be noted that various changes and modifications could be made herein without departing from the scope of the invention as defined by the appended claims. Functions, steps and/or actions in accordance with the method claims need not be performed in any particular order. Furthermore, although elements of the invention may be described or claimed in the singular, the plural is contemplated unless limitation to the singular is explicitly stated.

What is claimed is:

1. A method for accessing memory, comprising:
    storing in a translation lookaside buffer (TLB) a plurality of translation entries, each comprising a virtual address, a physical address and a local memory flag, wherein the local memory flag indicates whether the physical address is outside a local memory; and
    when a processor is in a low power mode:
        receiving a generated virtual address; and
        upon identifying a matching translation entry having a virtual address matching the generated virtual address, then, if the local memory flag of the matching translation entry indicates the physical address of the matching translation entry is outside the local memory, generating an out-of-access-range memory access exception,
    wherein when the out-of-access-range memory access exception is generated, the matching translation entry remains valid and no memory access is performed.

2. The method of claim 1, wherein also upon identifying the matching translation entry, if the local memory flag of the matching translation entry indicates the physical address is not outside the local memory, accessing the local memory based on the physical address.

3. The method of claim 1, further comprising, upon no matching translation entry being among the plurality of translation entries, generating a page fault signal.

4. The method of claim 3,
    wherein the generated virtual address is a first virtual address, and
    wherein the method further comprises:
        switching the processor to a normal power mode; and
        when the processor is in the normal power mode,
            receiving a second virtual address;
            upon identifying none of the plurality of translation entries having a virtual address matching the second virtual address, performing a hardware page walk based on the second virtual address; and
            upon the hardware page walk finding a virtual address-to-physical address mapping that matches the second virtual address, updating the TLB with a new translation entry corresponding to the second virtual address.

5. The method of claim 4, wherein updating the TLB includes setting the local memory flag of the new translation entry at a value indicating whether the physical address indicated by the virtual address-to-physical address mapping is outside or not outside the local memory.

6. The method of claim 4, further comprising, in association with switching the processor to the normal power mode, enabling a hardware page walker,
    wherein the hardware page walker performs the hardware page walk.

7. The method of claim 4, further comprising:
    switching the processor back to the low power mode; and
    in association with switching the processor to the low power mode, disabling a hardware page walker.

8. The method of claim 1, further comprising:
    switching the processor from a normal power mode to the low power mode; and
    in association with switching the processor to the low power mode, setting a power mode indicator in a register to a value indicating the low power mode.

9. The method of claim 8, wherein generating the out-of-access-range memory access exception is based on a concurrence of the local memory flag indicating the physical address of the matching translation entry is outside the local memory and the power mode indicator being at the value indicating the low power mode.

10. The method of claim 9, further comprising, upon none of the plurality of translation entries having a virtual address matching the generated virtual address, generating a low power mode TLB miss exception signal.

11. The method of claim 10, wherein generating the low power mode TLB miss exception signal comprises:
    generating, in response to identifying none of the plurality of translation entries having a virtual address matching the generated virtual address, a page fault signal indicating no matching translation entry found; and
    based on a concurrence of the page fault signal indicating no matching translation entry found and the power mode indicator being at the value indicating the low power mode, generating the low power mode TLB miss exception signal.

12. The method of claim 8, further comprising:
    switching the processor from the low power mode to the normal power mode;

in association with switching the processor to the normal power mode, setting the power mode indicator in the register to a value indicating the normal power mode; and when in the processor is in the normal power mode,
receiving another virtual address; and
upon identifying another matching translation entry having a virtual address matching the another virtual address, accessing a memory irrespective of the local memory flag.

13. An apparatus for accessing memory, comprising
a translation lookaside buffer (TLB) configured to
store a plurality of translation entries, each comprising a virtual address, a physical address and a local memory flag, wherein the local memory flag indicates whether the physical address is outside a local memory,
receive a generated virtual address, and
identify a matching translation entry having a virtual address matching the generated virtual address; and
an out-of-access-range exception circuit configured to generate, in response to the local memory flag of the matching translation entry indicating the physical address of the matching translation entry is outside the local memory, an out-of-access-range memory access exception,
wherein when the out-of-access-range memory access exception is generated, the matching translation entry remains valid and no memory access is performed.

14. The apparatus of claim 13, further comprising:
a register configured to store a power mode indicator at a value indicating a low power mode,
wherein the out-of-access-range exception circuit is configured to generate the out-of-access-range memory access exception based on a concurrence of the local memory flag indicating the physical address of the matching translation entry is outside the local memory and the power mode indicator being at the value indicating the low power mode.

15. The apparatus of claim 14, further comprising a circuitry configured to generate, in response to identifying no matching translation entry having a virtual address matching the generated virtual address, a low power mode TLB miss exception signal.

16. The apparatus of claim 14,
wherein the TLB is configured to generate, in response to identifying no matching translation entry having a virtual address matching the generated virtual address, a page fault signal indicating no matching translation entry found, and
wherein the apparatus further comprises a logic configured to generate, based on a concurrence of the page fault signal indicating no matching translation entry found and the power mode indicator being at the value indicating the low power mode, a low power mode TLB miss exception signal.

17. The apparatus of claim 14,
wherein the power mode indicator is switchable between the value indicating the low power mode and a value indicating a normal power mode, and
wherein the out-of-access-range exception circuit is configured to generate the out-of-access-range memory access exception based on a concurrence of the local memory flag indicating the physical address of the matching translation entry is outside the local memory and the power mode indicator being at the value indicating the low power mode.

18. The apparatus of claim 17, wherein the out-of-access-range exception circuit is further configured to disable generating, in response to the power mode indicator being at the value indicating the normal power mode, the out-of-access-range memory access exception.

19. The apparatus of claim 18,
wherein the TLB is configured to generate, in response to identifying none of the plurality of translation entries having a virtual address matching the generated virtual address, a page fault signal indicating no matching translation entry found, and
wherein the apparatus further comprises a hardware page walker circuit configured to
receive the power mode indicator and the page fault signal, and
perform, in response to a concurrence of the page fault signal indicating no matching translation entry found and the power mode indicator being at the value indicating the normal power mode, a hardware page walk based on the generated virtual address.

20. The apparatus of claim 19, wherein the hardware page walker circuit is configured to be disabled in response to receiving the power mode indicator at the value indicating the low power mode.

21. The apparatus of claim 19,
wherein the hardware page walker circuit is configured to provide to the TLB, in response to finding a virtual address-to-physical address mapping that matches the generated virtual address, the virtual address-to-physical address mapping, and
wherein the TLB is configured to update the TLB with a new translation entry corresponding to the generated virtual address.

22. The apparatus of claim 21, wherein the TLB is configured to include setting the local memory flag of the new translation entry at a value indicating whether the physical address indicated by the virtual address-to-physical address mapping is outside or not outside the local memory.

23. An apparatus for accessing memory, comprising:
means for storing a plurality of translation entries, each comprising a virtual address, a physical address and a local memory flag, wherein the local memory flag indicates whether the physical address is outside a local memory;
means for receiving, when a processor is in a low power mode, a generated virtual address;
means for identifying a matching translation entry having a virtual address matching the generated virtual address; and
means for generating, if the local memory flag of the matching translation entry indicates the physical address of the matching translation entry is outside the local memory, an out-of-access-range memory access exception,
wherein when the out-of-access-range memory access exception is generated, the matching translation entry remains valid and no memory access is performed.

24. A non-transitory computer-readable medium comprising code, which, when executed by a processor, causes the processor to:
store in a translation lookaside buffer (TLB) a plurality of translation entries, each comprising a virtual address, a physical address and a local memory flag, wherein the local memory flag indicates whether the physical address is outside a local memory; and
when the processor is in a low power mode,
receive a generated virtual address; and upon identifying a matching translation entry having a virtual address matching the generated virtual address, then, if the local memory flag of the matching translation entry indicates the physical address of the matching translation entry is outside the local memory, generate an out-of-access-range memory access exception, wherein when the out-of-access-range memory access exception is generated, the matching translation entry remains valid and no memory access is performed.

* * * * *